US007973678B2

(12) United States Patent
Petricoin, Jr. et al.

(10) Patent No.: US 7,973,678 B2
(45) Date of Patent: Jul. 5, 2011

(54) CONTROL OF BUILDING SYSTEMS BASED ON THE LOCATION AND MOVEMENT OF A VEHICLE TRACKING DEVICE

(75) Inventors: Dennis M. Petricoin, Jr., Hemlock, NY (US); Melvin Chapman, Salisbury, MD (US); Steven Markham, Rochester, NY (US)

(73) Assignee: Robert Bosch GmbH, Stuttgart (DE)

( * ) Notice: Subject to any disclaimer, the term of this patent is extended or adjusted under 35 U.S.C. 154(b) by 329 days.

(21) Appl. No.: 12/364,082

(22) Filed: Feb. 2, 2009

(65) Prior Publication Data
US 2010/0198367 A1 Aug. 5, 2010

(51) Int. Cl.
| | |
|---|---|
| G08G 1/123 | (2006.01) |
| H04W 24/00 | (2009.01) |
| G05B 15/00 | (2006.01) |
| G05B 13/00 | (2006.01) |
| G01C 21/00 | (2006.01) |
| G01C 21/30 | (2006.01) |
| G01C 21/32 | (2006.01) |
| G01C 9/00 | (2006.01) |
| G01C 17/00 | (2006.01) |
| G01C 19/00 | (2006.01) |
| G01P 11/00 | (2006.01) |
| G01M 1/38 | (2006.01) |
| G05D 23/00 | (2006.01) |

(52) U.S. Cl. ............ 340/990; 340/992; 340/995.14; 455/457; 700/83; 700/275; 701/201; 701/208; 702/149; 702/150

(58) Field of Classification Search ............... 340/572.1, 340/988–994, 995.1, 995.14, 995.27, 995.28; 455/456.1–457; 700/83, 275; 701/200, 201, 206–208, 213; 702/142, 149, 150, 187, 188
See application file for complete search history.

(56) References Cited

U.S. PATENT DOCUMENTS

| | | | | |
|---|---|---|---|---|
| 5,848,373 | A | * | 12/1998 | DeLorme et al. ............. 701/200 |
| 6,031,465 | A | | 2/2000 | Burgess |
| 6,353,390 | B1 | * | 3/2002 | Beri et al. .................. 340/572.1 |
| 6,434,158 | B1 | | 8/2002 | Harris et al. |
| 6,476,732 | B1 | | 11/2002 | Stephan |
| 6,509,830 | B1 | * | 1/2003 | Elliott ....................... 340/286.02 |
| 6,559,769 | B2 | * | 5/2003 | Anthony et al. .............. 340/574 |

(Continued)

FOREIGN PATENT DOCUMENTS
WO 01/23227 4/2001

*Primary Examiner* — Crystal J Barnes-Bullock
(74) *Attorney, Agent, or Firm* — Michael Best & Friedrich LLP (57) ABSTRACT

A control for a system in a building. The control includes a tracking device, a controller, and a programmer. The tracking device is configured to travel with a vehicle and to determine where the tracking device is located. The controller is configured to be located in the building, to communicate with the tracking device, to communicate with the system in the building, to determine an event that should be executed based on information received from the tracking device and a programmed event trigger. The programmed event trigger includes a programmed location for the tracking device. The controller generates a command for the system in the building to execute the determined event. The programmer is configured to communicate with a user interface. The user interface includes an interactive map and one or more geographical boundary tools for creating one or more event triggers on the map. A user uses the user interface to program the event triggers.

18 Claims, 4 Drawing Sheets

U.S. PATENT DOCUMENTS

| | | |
|---|---|---|
| 6,593,856 B1 | 7/2003 | Madau |
| 6,615,132 B1 | 9/2003 | Nagasaka et al. |
| 6,617,975 B1 | 9/2003 | Burgess |
| 6,662,016 B1 * | 12/2003 | Buckham et al. ............. 455/457 |
| 6,798,336 B2 | 9/2004 | Kanda et al. |
| 7,035,647 B2 * | 4/2006 | de Verteuil ................ 455/456.1 |
| 7,088,265 B2 | 8/2006 | Tsui et al. |
| 7,106,171 B1 | 9/2006 | Burgess |
| 7,133,685 B2 * | 11/2006 | Hose et al. ................ 455/456.1 |
| 7,170,426 B2 | 1/2007 | Tsui et al. |
| 7,202,801 B2 * | 4/2007 | Chou ........................... 340/994 |
| 7,205,908 B2 | 4/2007 | Tsui et al. |
| 7,231,218 B2 * | 6/2007 | Diacakis et al. ........... 455/456.1 |
| 7,424,399 B2 * | 9/2008 | Kahn et al. ................... 702/188 |
| 7,446,644 B2 | 11/2008 | Schaffzin et al. |
| 7,487,114 B2 * | 2/2009 | Florance et al. ............ 705/27.2 |
| 7,848,905 B2 * | 12/2010 | Troxler et al. ............... 702/187 |
| 2003/0197594 A1 | 10/2003 | Olson et al. |
| 2003/0197595 A1 | 10/2003 | Olson et al. |
| 2003/0200192 A1 * | 10/2003 | Bell et al. ........................ 707/1 |
| 2003/0216817 A1 | 11/2003 | Pudney |
| 2004/0219932 A1 * | 11/2004 | Verteuil ..................... 455/456.2 |
| 2005/0242923 A1 | 11/2005 | Pearson et al. |
| 2006/0197660 A1 | 9/2006 | Luebke et al. |
| 2007/0063814 A1 | 3/2007 | Olson et al. |
| 2007/0126561 A1 | 6/2007 | Breed |
| 2007/0216764 A1 | 9/2007 | Kwak |
| 2008/0065235 A1 | 3/2008 | Igoe et al. |
| 2008/0084332 A1 * | 4/2008 | Ritter et al. ................... 340/989 |
| 2008/0125965 A1 * | 5/2008 | Carani et al. .................. 701/207 |
| 2008/0288104 A1 * | 11/2008 | Shani ............................. 700/214 |
| 2009/0132163 A1 * | 5/2009 | Ashley et al. ................. 701/206 |
| 2009/0319180 A1 * | 12/2009 | Robinson et al. ............. 701/208 |
| 2010/0256825 A1 * | 10/2010 | Nielsen et al. ................ 700/283 |

* cited by examiner

CONTROL OF BUILDING SYSTEMS BASED ON THE LOCATION AND MOVEMENT OF A VEHICLE TRACKING DEVICE

BACKGROUND

Automated systems for the home generally rely upon a user input. For example, an automatic garage door is activated from a signal generated by a remote control (or garage door opener). The signal from the garage door opener is generated in response to a person or user depressing a button (or otherwise inputting information to the door opener). In other systems, user input causes, for example, the arming or disarming of a security system, lights to turn on or off, or a heating, ventilation and cooling (HVAC) system to turn on or off.

There are even some systems that operate without user input. For example, some outdoor lights are configured with a light sensor. When ambient light levels pass below a certain level, a signal from the sensor causes the outdoor light to turn on.

SUMMARY

Although a variety of mechanisms exist for controlling the operation of automated systems used in homes, control of such systems based on the movement and location of tracking devices is believed to be a nascent area of control technology.

The present invention relates to an automated control system where operations are automatically executed based on the location and/or movement of one or more tracking devices.

In one embodiment, the invention provides a control for a system in a building. The control includes a tracking device, a controller, and a programmer. The tracking device is configured to travel with a vehicle and to determine where the tracking device is located. The controller is configured to be located in the building, to communicate with the tracking device, to communicate with the system in the building, to determine an event that should be executed based on information received from the tracking device and a programmed event trigger including a programmed location for the tracking device, and to generate a command for the system in the building to execute the determined event. The programmer is configured to communicate with a user interface. The user interface includes an interactive map and one or more geographical boundary tools for creating one or more event triggers on the map. A user uses the user interface to program the event triggers.

In another embodiment, the invention provides a control for a system in a building. The control includes a plurality of tracking devices, a controller, and a programmer. Each tracking device travels with a vehicle and determines its location. The controller is located in the building, communicates with each of the tracking devices, communicates with the system in the building, and determines an event that should be executed based on information received from one or more of the plurality of the tracking devices and one or more programmed event triggers. At least one of the programmed event triggers includes a programmed location for at least one of the plurality of tracking devices, a programmed direction for at least one of the plurality of tracking devices, and a programmed speed for at least one of the plurality of tracking devices. The controller generates a command for the system in the building which includes information for executing the determined event. The programmer communicates with a user interface. The user interface includes an interactive map and one or more geographical boundary tools for creating one or more event triggers on the map which generate the programmed event trigger.

In another embodiment, the invention provides a method of controlling a building system. The method includes the acts of determining the location of a tracking device configured to travel with a vehicle, wirelessly transmitting the determined location of the tracking device to a controller located in the building, creating an event trigger with one or more criteria selected from the group of location, direction, speed, and time via a computer-generated user interface using one or more geographical boundary tools to draw a geographic boundary on a map displayed on the computer-generated user interface, determining, based at least in part on the determined location, that the tracking device has met one or more criteria of the event trigger, and modifying the operation of the building system when one or more criteria of the preprogrammed event trigger are met.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

The invention relates to a system for automatically initiating events based on the location and/or movement of one or more tracking devices. For example, an automobile can trigger an event (e.g., setting back a thermostat of a home heating system) when the automobile passes through a user defined location. Additional parameters, such as direction, speed, and/or time are also used to determine whether to trigger an event.

Figure 1:
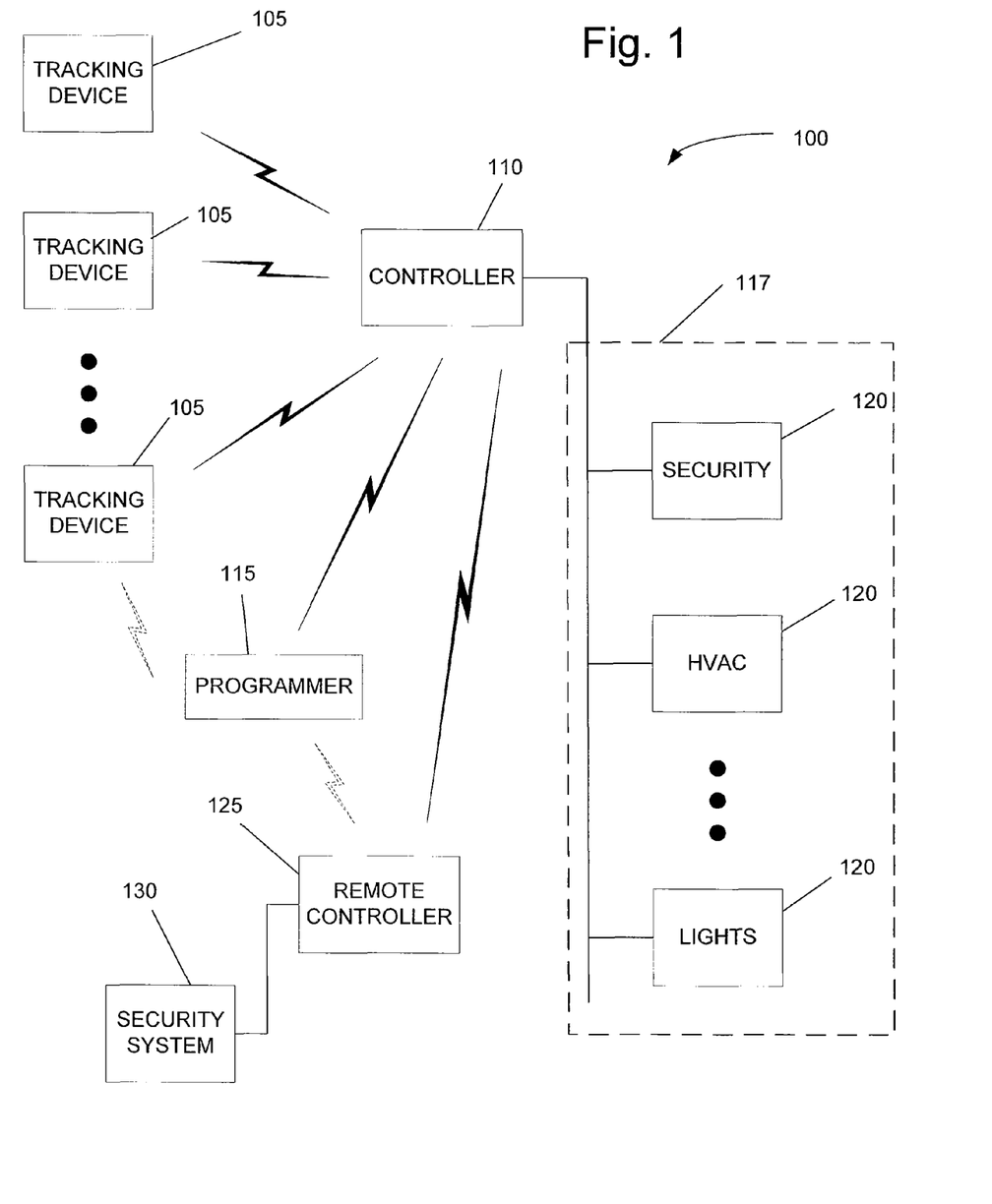
FIG. 1 is a block diagram of an automated control system according to an embodiment of the invention.

FIG. 1 shows an embodiment of a remote triggering system 100. The system 100 includes one or more tracking devices 105, a controller 110, a programmer 115, and a building system 117 including a plurality of controllable devices 120. The plurality of controllable devices 120 are generally located in and/or near a building (e.g., in a home and garage, in a business and a parking lot, etc.). The controller 110 also is generally located in the building. In some embodiments, the system 100 also includes one or more remote controllers 125 for controlling one or more remote controllable devices 130 located in a remote building (e.g., at a vacation home). In some embodiments, the controllers 110/125 are located outside of a building housing the controllable devices 120/130 (e.g., a security company location which communicates with a security system located in the building).

The tracking devices 105 are communicatively linked (e.g., satellite, radio frequency (RF), cellular, WiFi, or other wireless communication method) with the controller 110. In some embodiments, multiple methods of communication are used. For example, in some embodiments the tracking devices 105 and the controllers 110 and 125 communicate using RF when the tracking device 105 is within a certain distance (e.g., a predetermined distance such as one mile, or when a signal strength is above a threshold). A second method of communication (e.g., cellular communications) is used when the tracking device 105 is beyond the distance. In some embodiments, one or more of the tracking devices 105 are also communicatively linked to one or more remote controllers 125. In embodiments incorporating a remote controller 125, the controller 110 acts as a gateway or router, forwarding information received from the tracking devices 105 to the remote controller 125.

The tracking device 105 provides the controller 110 and/or the remote controller(s) 125 with information related to the location of the tracking device 105. The tracking device 105 may also provide the controllers 110 and 125 with a speed and/or direction at which the tracking device 105 is moving. The tracking device 105 determines its position and speed in a suitable manner (e.g., via a global positioning system (GPS) or cellular triangulation). The controllers 110 and 125 then determine, based on the information provided by the tracking device 105, whether and which events should be executed. In other embodiments, the tracking device 105 determines whether and which events should be executed based on the location, speed, and/or direction of the tracking device. The tracking device 105 then communicates the event(s) to the controllers 110 and 125 for execution (e.g., arming a security system). The tracking device 105 can be mounted in a vehicle (e.g., an automobile or motorcycle) or can be carried by a user (e.g., in a cell phone or key fob).

The controllers 110 and/or 125 poll the tracking devices 105 to obtain information on the location, speed, and/or direction of the tracking devices 105. Polling is generally performed on timed basis (e.g., once a minute). The amount of time between polling of a tracking device 105 can vary based on the previous data received from the tracking device 105. For example, a tracking device 105 that was not moving when last polled, may be polled once every five minutes, and a tracking device 105 that was moving at sixty miles per hour when last polled may be polled every thirty seconds. In other embodiments, the tracking devices 105 provide information to the controllers 110 and 125 unsolicited, based on the movement of the tracking device 105 and/or elapsed time periods. In these embodiments, the controllers 110 and 125 or the tracking devices 105 may occasionally perform a communications test (e.g., every thirty minutes) to ensure they are still linked. In some embodiments, the tracking devices 105 record information for a period of time, and provide the recorded information to the controllers 110 and 125 (polled or unsolicited). The recorded information can be raw information (e.g., continuous snapshots of location/speed/direction) or can be manipulated (e.g., a start and end point with a direction and time to traverse the distance, or multiple starting and ending points, etc. if the tracking device 105 has changed direction since the last transmission of data to the controller 110).

Events are triggered based on information preprogrammed into the system 100 by a user. An event can change an operating condition of one or more controllable devices 120/130 such as arming/disarming a security system, raising/lowering a temperature setting on an HVAC system and/or water heater, turning lights on/off, turning entertainment systems on/off, opening/closing a garage door, sending a text message (e.g., to a marina asking to prepare a boat for launching), or other desired events. Some events may require a confirmation from a user. These events may send a message to a user (e.g., a text message to a cellular phone or a message to a tracking device 105) indicating that a confirmation is needed. A user receiving the message would then need to respond (e.g., via a text message or pressing a confirmation button on the tracking device 105) before the event is executed, and the operating condition of a controllable device 120 is changed. To execute an event that changes an operating condition of one or more controllable devices 120/130, the controller 110/125 generates a command to effect the change. Generating the command can include sending a communication over a network to the controllable device(s) 120/130 (e.g., to arm a security system), sending a signal to the controllable device(s) 120/130, applying/removing power to the controllable device(s) 120/130, or other control function.

Events are triggered based on one or more of the following criteria: a tracking device 105 passing through or arriving at a location, the tracking device 105 moving above/below a preset speed, the tracking device 105 moving in a certain direction, the time of day being within/outside of a time range (when the tracking device 105 passes through or arrives at the location), the location/speed/direction of another tracking device 105, and/or other factors (e.g., an altitude of the tracking device 105, or the amount of ambient light—the system 100 may not turn on lights if it is sunny out).

A user uses an operator interface on the programmer 115 to enter events and event triggers into the system 100. A database, described in more detail below, stores the events and event triggers. In some embodiments, the programmer 115 updates the database in the controller 110 and/or the tracking device 105 directly. In other embodiments, the programmer 115 creates/updates a database locally, and downloads the entire database (or appropriate portions of the database) to the controller 110 and/or tracking devices 105. The programmer 115 can be a dedicated programmer (e.g., proprietary to the system 100 such as an touch screen operator interface integrated into the controller 110) or can be a general purpose system (e.g., a personal computer). In some embodiments, the programmer 115 is a personal computer executing an application which then transfers the events and event triggers to the controller 110 and/or the tracking devices 105. In some embodiments, the programmer 115 is implemented as a web-based application for programming the system 100. For example, the controller 110 and/or the tracking devices 105 can include a web server linked to the Internet. The user accesses the controller 110 and/or the tracking devices 105 over the Internet and programs the events and event triggers. In some embodiments, the programmer 115 programs the remote controllers 125 directly (e.g., the programmer 115 links to the remote controllers 125). In other embodiments, the remote controllers 125 receive programs and/or events to execute from the controller 110 and/or the tracking device 105.

The invention contemplates varying levels of sophistication for programming the system 100. For example, programming can be performed using a text based operator interface where a user enters coordinates and links the coordinates to events. Other embodiments include a sophisticated operator interface including a mapping system provided with tools for setting event triggers, and drop down windows for programming/selecting events.

Figure 2:
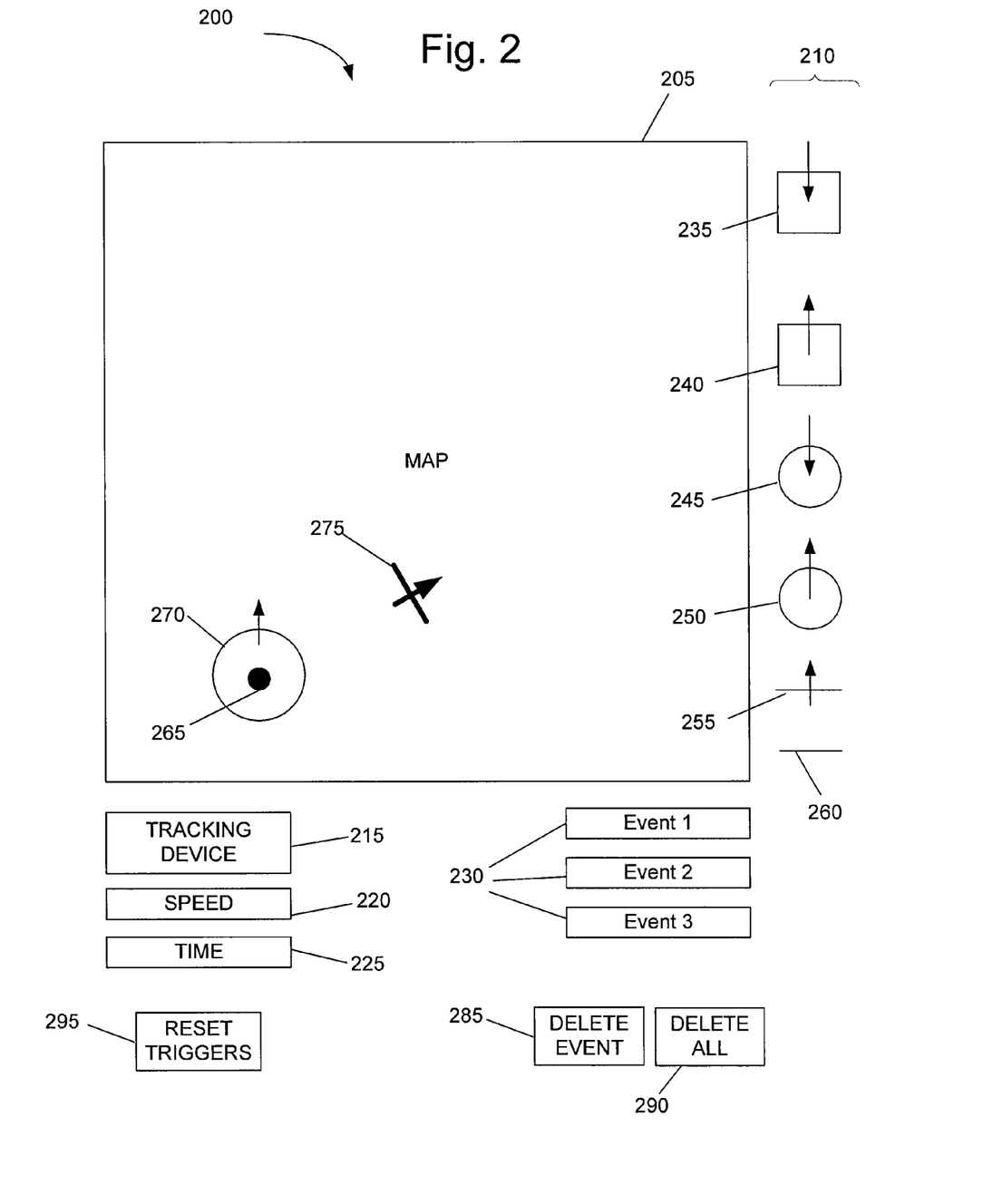
FIG. 2 is an embodiment of a programming system for the automated control system of FIG. 1.

FIG. 2 illustrates an embodiment of an operator interface 200 for programming event triggers. A user logs on to the system and enters a password to gain access to the database. In some embodiments, the operator interface 200 is provided directly by the controller 110 (e.g., a touch screen interface integrated into the controller 110). In other embodiments, the operator interface 200 is provided as a web page accessed over the Internet. In the embodiment shown, the operator interface 200 includes a window 205 providing an interactive map (e.g., Google Maps), a trigger tool bar 210 including a plurality of trigger creation tools (i.e., geographical boundary tools), a tracking device selection pull down box 215, a speed entry box 220, a time entry box 225, and a plurality of event pull down boxes 230. The trigger creation tools include a directionally-dependent tools such as a rectangle entering tool 235, a rectangle leaving tool 240, a circle entering tool 245, a circle leaving tool 250, and a barrier-with-direction tool 255; and directionally-independent tools such as a barrier tool 260.

The rectangle entering tool 235 is used to create a rectangular boundary on the map. An event associated with the created boundary is executed when a tracking device 105 associated with the boundary enters the area defined by the rectangle boundary, provided any additional programmed parameters, as described below, are also met. The rectangle leaving tool 240 is also used to create a rectangular boundary on the map. However, an event associated with the boundary is executed when a tracking device 105 associated with the boundary exits the area defined by the boundary, provided any additional programmed parameters are also met. The circle entering and leaving tools 245 and 250 are used to create circular boundaries on the map. Associated events are triggered when a tracking device 105 enters or leaves, respectively, the boundaries created by the tools 245 and 250, again provided any additional parameters are met. The barrier-with-direction tool 255 and the barrier tool 260 are used to create barriers on the map. A length of the barriers determines where on the map an associated event is triggered. So, for example, if a barrier is created extending across a single street at an intersection, a user could avoid triggering the event by using an alternate route that did not cross the intersection. The barrier-with-direction tool 255 creates barriers which require a tracking device 105 to pass through the barrier in a certain direction in order to trigger the associated event. The barrier tool 260, however, triggers an associated event, providing any other parameters are met, whenever the associated tracking device 105 passes through the barrier, regardless of direction.

To program the system 100, a user manipulates the map (e.g., by selecting a location, zooming in/out, etc.) to select a location for setting an event trigger. The user then drags a trigger creation tool from the tool bar onto the map, rotating and sizing the tool as desired. For example, a dot 265 on the map represents a user's house. The user drags the circle leaving tool 250 over the house 265 and adjusts the size of the tool 250 creating a boundary 270 that represents an event trigger that will execute an event when an associated tracking device 105 passes out of the boundary 270. The map includes a directional-dependent barrier 275 (or, put another way a barrier with direction). A user, using a mouse or other pointing device, positions a cursor over an event trigger and left clicks to select the event trigger, in this case the barrier 275. When selected, the event trigger is highlighted (e.g., shown in bold). When barrier 275 is selected, the barrier 275 is shown in bold, and the tracking device selection pull down box 215, the speed entry box 220, the time entry box 225, and the plurality of event pull down boxes 230 associated with the barrier 275 are populated with data previously programmed for the barrier 275. The user can then enter/modify the events that are triggered by the tracking device 105 passing through the barrier in the direction shown, along with the other parameters such as the speed entered in the speed entry box 220 and the time entered in the time entry box 225. Entry of a speed and/or a time is optional. Speed entries can be a speed greater than a threshold, less than a threshold, or within a range of speeds. Time entries can be before a time of the day, after a time of the day, or between two times.

A delete event trigger button 285 deletes the selected (i.e., highlighted) event trigger (e.g., the barrier 275). A delete-all-button 290 deletes all the event triggers programmed. In some embodiments, a confirmation dialog box appears when one of the delete buttons 285 or 290 is selected to ensure the user wants to delete the event trigger(s). A reset triggers button 295 resets the status of all events to "not executed."

In some embodiments, the controller 110 includes a database. The database is populated by the programmer 115 and includes data on the system 100, the tracking devices 105, the controllable devices 120, one or more polling schemes, the events, and the event triggers. Data on the controllable devices 120 includes a description (e.g., security system, front porch lights, etc.), information on how to communicate with and/or control the device (e.g., via a network, i.e., including a network address, or via direct control, i.e., hardwired), and types of actions possible (e.g., on/off control, setting a range of temperatures, etc.).

Data on the events includes actions to be taken with one or more controllable devices 120 (e.g., arm security system, turn off porch lights, etc.), an event status (e.g., presently executed/not executed), logic (e.g., including operators such as if-then, OR, and AND for controlling controllable devices 120 based on the status of other events).

Data on the tracking devices 105 includes an identifier (e.g., an address), a description (e.g., Dad's car), and communication data (e.g., polled or tracking device initiated, a scheme, and a method of communication). Polling schemes include when and how often to poll a tracking device 105. For example, a tracking device 105 that is not moving may be polled once every ten minutes while a tracking device 105 that is moving at 60 mph may be polled every thirty seconds. Other tracking devices 105 may initiate communication with the controller 110 based on movement of the tracking device 105 or when movement of the tracking device 105 triggers an event.

Data on the event triggers includes actions of the tracking device 105 (e.g., location, direction, speed, and/or time), the tracking devices 105 associated with the event trigger (e.g., a first car may open a first garage door while a second car may open a second garage door), and the events to execute.

For example, in order to arm a security system for a family with two cars, a first event trigger can be triggered when the first car travels beyond a boundary around the house. A second event trigger can be triggered when the second car travels beyond the boundary around the house. The first event trigger can execute a first event, and the second event trigger can execute a second event. When the first event executes, it sets its status to executed, and checks the status of the second event. If the status of the second event is "executed," the first event executes a third event which issues a command to the security system to arm the security system. If the status of the second event is not "executed," the first event does not execute the third event and arm the security system. When the second event executes, it likewise checks the status of the first event, and executes the third event only if the status of the first event is "executed." Thus, the security system is not armed by one car leaving the house. Instead the security system is armed when both cars have moved beyond the boundary around the house.

Figure 3:
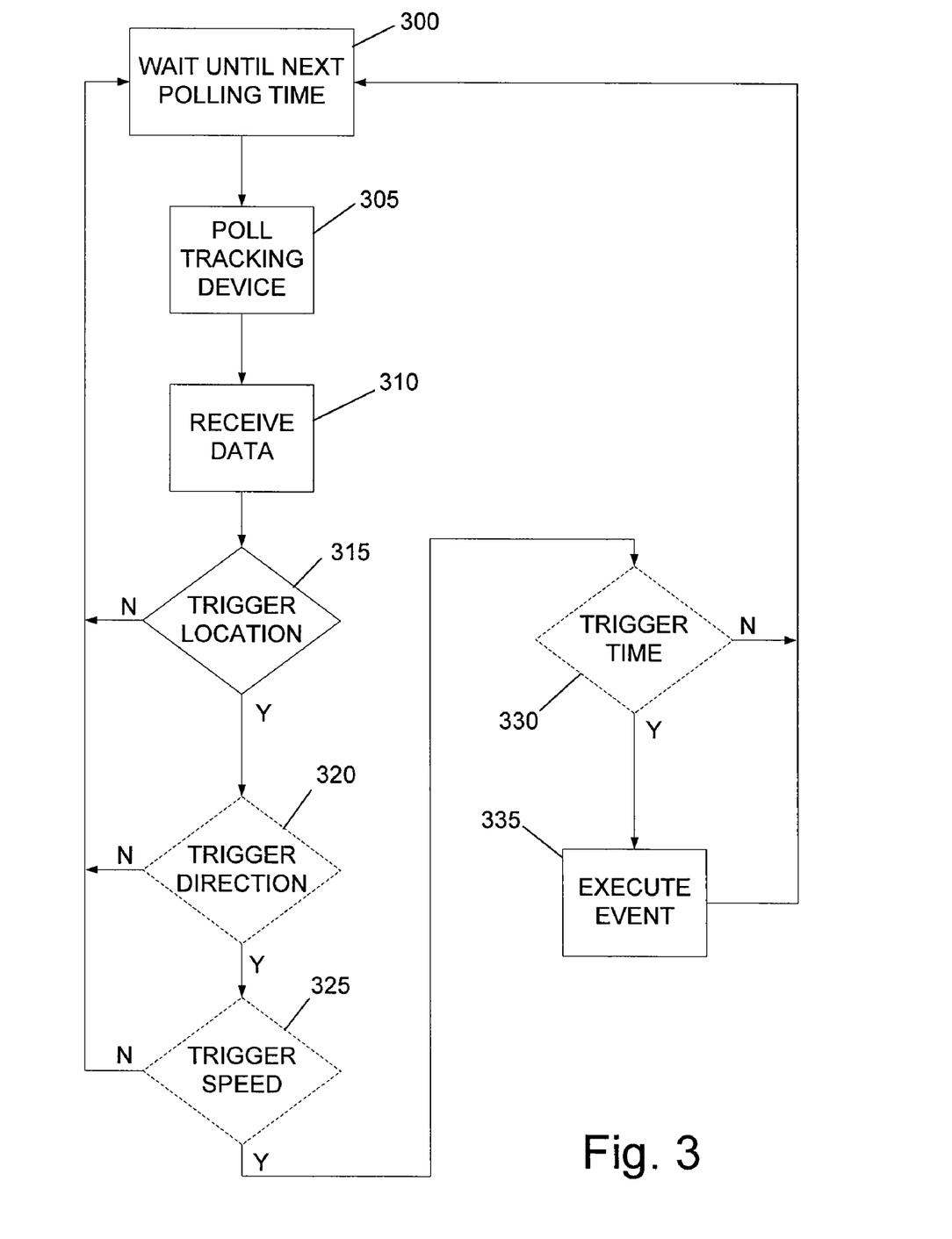
FIG. 3 is a flow chart of an embodiment of the operation of a controller implementing a polling communication scheme with a trigger device.

FIG. 3 illustrates a flow chart of an embodiment of the operation of a polling operation of the system 100. The controller 110 waits until a polling time is reached (step 300). The polling time is based on the polling scheme programmed in the database as described above. When a polling time is reached, the controller 110 polls the tracking device 105 (step 305) and receives data back from the tracking device 105 (step 310). In some embodiments, the data is simply a location, in which case the controller 110 uses previously received location information to determine a speed and direction of the tracking device 105. In other embodiments, the data includes speed and direction information or even detailed routing information (e.g., various speed and direction changes since the last data transfer). The controller 110 analyzes the data received from the tracking device 105. The controller 110 also determines if the tracking device 105 has passed through an event trigger location stored in the data base (and associated with the tracking device 105) since the last time the tracking device 105 was polled (step 315). If the tracking device 105 has not passed through an event trigger location, the controller 110 waits until the next polling time (step 300) and repeats the process. If the tracking device 105 has passed through an event trigger location, the controller 110 determines if the tracking device 105 passed through the event trigger location in the proper direction (if the event trigger incorporates a direction) (step 320). If the tracking device 105 did not pass through the event trigger in the correct direction, the controller 110 waits until the next polling time (step 300) and repeats the process. If the direction was correct, the controller 110 determines if the tracking device 105 passed through the event trigger location at the proper speed (if the event trigger incorporates a speed) (step 325). If the tracking device 105 did not pass through the event trigger at the proper speed, the controller 110 waits until the next polling time (step 300) and repeats the process. If the speed was correct, the controller 110 determines if the tracking device 105 passed through the event trigger location at the proper time (if the event trigger incorporates a time) (step 330). If the tracking device 105 did not pass through the event trigger at the proper time, the controller 110 waits until the next polling time (step 300) and repeats the process. If the tracking device 105 did pass through the event trigger at the proper time (i.e., the programmed location, direction, speed, and/or time for the event trigger match the actual location, direction, speed, and/or time), the controller 110 executes the events (or generates a command to execute the events) associated with the event trigger (step 335) and then waits until the next polling time (step 300). Each of the direction, speed, and time are optional entries.

Figure 4:
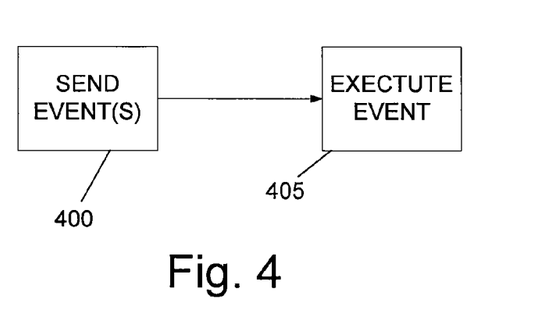
FIG. 4 is a flow chart of an embodiment of a trigger device initiated communication scheme.
Figure 5:
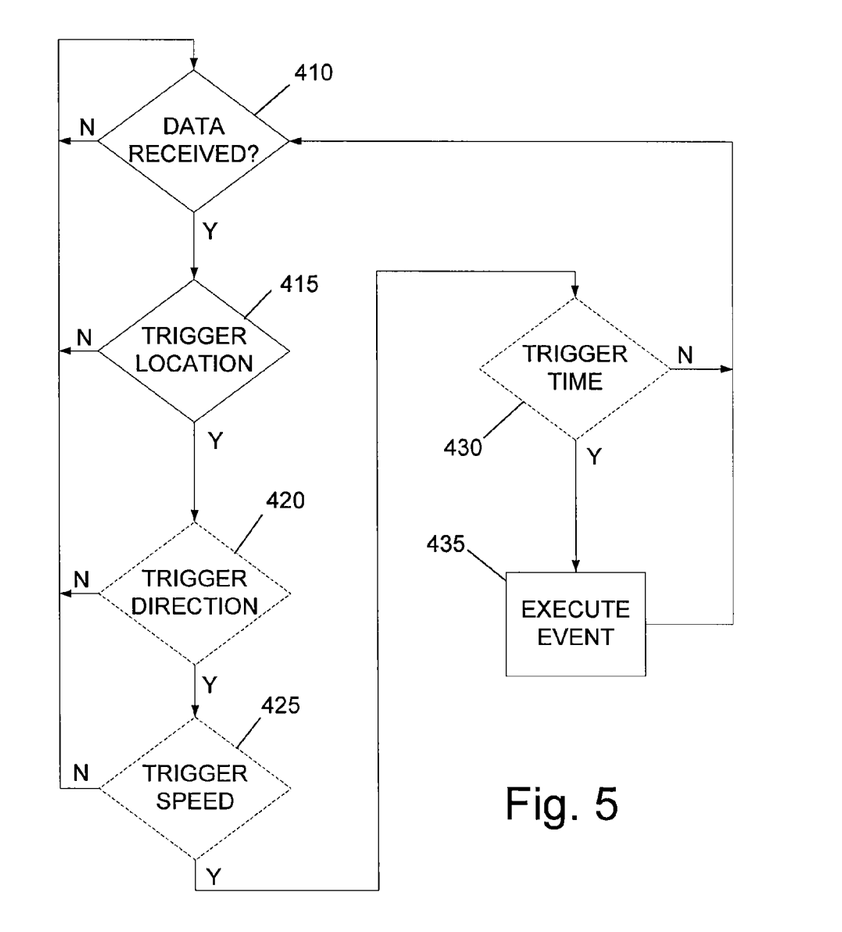
FIG. 5 is a flow chart of a second embodiment of a trigger device initiated communication scheme.

FIGS. 4 and 5 illustrate flow charts of the operation of embodiments of the system 100 where a tracking device 105 initiates the communications with the controller 110. In the embodiment shown in FIG. 4, the tracking device 105 stores the event triggers, and analyzes its movement relative to the event triggers. When an event trigger occurs (e.g., the tracking device 105 passes through a barrier), the tracking device 105 sends the event(s) to execute to the controller 110 (step 400). The controller 110 then executes the event(s) (or generates a command to execute the events) (step 405). In the embodiment shown in FIG. 5, the tracking device 105 sends data to the controller 110 based upon preprogrammed criteria. Criteria can include a distance traveled, a change in direction, an elapsed period of time, or a combination of these or other criteria. When the controller 110 receives data from a tracking device 105 (step 410), the controller 110 analyzes the data received from the tracking device 105, and determines if the tracking device 105 has passed through an event trigger location stored in the data base and associated with the tracking device 105 since the last time the tracking device 105 was polled (step 415). If the tracking device 105 has not passed through an event trigger location, the controller 110 waits until the next time data is received from the tracking device 105 (step 410). If the tracking device 105 has passed through an event trigger location, the controller 110 determines if the tracking device 105 passed through the event trigger location in the proper direction (if the event trigger incorporates a direction) (step 420). If the tracking device 105 did not pass through the event trigger in the correct direction, the controller 110 waits until the next data is received from the tracking device 105 (step 410). If the direction was correct, the controller 110 determines if the tracking device 105 passed through the event trigger location at the proper speed (if the event trigger incorporates a speed) (step 425). If the tracking device 105 did not pass through the event trigger at the proper speed, the controller 110 waits until the next data is received from the tracking device 105 (step 410). If the speed was correct, the controller 110 determines if the tracking device 105 passed through the event trigger location at the proper time (if the event trigger incorporates a time) (step 430). If the tracking device 105 did not pass through the event trigger at the proper time, the controller 110 waits until the next polling time (step 410) and repeats the process. If the tracking device 105 did pass through the event trigger at the proper time, the controller 110 executes the events (or generates a command to execute the events) associated with the event trigger (step 435) and then waits until the next polling time (step 410). Each of the direction, speed, and time are optional entries.

Different tracking devices 105 in the system 100 can incorporate different communication methods. For example, in some embodiments, a first tracking device 105 is polled (e.g., as shown in FIG. 3) and a second tracking device 105 initiates communications with the controller 110 (e.g., FIGS. 4 and/or 5). In addition, in some embodiments, a tracking device 105 is polled at certain times (e.g., when the tracking device 105 is not moving) and initiates communication at other times (e.g., when the tracking device 105 is moving). In some embodiments, multiple tracking devices 105 communicate with each other (e.g., to determine if an event should be executed).

Various features and advantages of the invention are set forth in the following claims.

What is claimed is:

1. A control for a system in a building, the control comprising:
    a tracking device configured to travel with a vehicle and to determine where the tracking device is located;
    a controller configured
        to be located in the building,
        to communicate with the tracking device,
        to communicate with the system in the building,
        to determine an event that should be executed based on information received from the tracking device and a programmed event trigger, the event trigger including a programmed location for the tracking device, and
        to generate a command for the system in the building, the command including information to execute the determined event; and
    a programmer configured to communicate with a user interface, the user interface having an interactive map and one or more geographical boundary tools for creating one or more event triggers on the map and through which the programmed event trigger is generated.

2. The control of claim 1, wherein the programmer is configured to interface with a web page and the web page generates the user interface.

3. The control of claim 1, wherein the programmer is configured to generate the user interface.

4. The control of claim 1, wherein the controller polls the tracking device to obtain the location of the tracking device.

5. The control of claim 1, wherein the event trigger includes a programmed direction of movement of the tracking device.

6. The control of claim 5, wherein one or more of the one or more geographic boundary tools of the programmer are configured to generate event triggers that include directionally-dependent geographic boundaries and directionally-independent geographic boundaries.

7. The control of claim 5, wherein the controller is configured to send the command to the system in the building when the location of the tracking device and a direction of movement of the tracking device match the programmed location and the programmed direction.

8. The control of claim 5, wherein the event trigger includes a programmed speed for the tracking device, and the controller is configured to send the command to the system in the building when the location, direction, and speed of the tracking device match the programmed location, direction, and speed.

9. The control of claim 1, wherein the controller includes a database, the database including the programmed event trigger.

10. The control of claim 1, further comprising a remote controller configured to communicate with the programmer and the controller.

11. A control for a system in a building, the control comprising:
   a plurality of tracking devices, each tracking device configured to travel with a vehicle and to determine its location;
   a controller configured
      to be located in the building,
      to communicate with each of the tracking devices,
      to communicate with the system in the building,
      to determine an event that should be executed based on information received from one or more of the plurality of the tracking devices and one or more programmed event triggers, at least one of the programmed event triggers including a programmed location for at least one of the plurality of tracking devices, a programmed direction for at least one of the plurality of tracking devices, and a programmed speed for at least one of the plurality of tracking devices, and
      to generate a command for the system in the building, the command including information to execute the determined event; and
   a programmer configured to communicate with a user interface, the user interface having an interactive map and one or more geographical boundary tools for creating one or more event triggers on the map and through which the programmed event trigger is generated.

12. The control of claim 11, wherein the at least one of the programmed event triggers is based on a time.

13. A method of controlling a building system, the method comprising:
   determining the location of a tracking device configured to travel with a vehicle;
   wirelessly transmitting the determined location of the tracking device to a controller configured to be located in a building;
   creating an event trigger with one or more criteria selected from the group consisting of location, direction, speed, and time, the event trigger created using a computer-generated user interface and by using one or more geographical boundary tools to draw a geographic boundary on a map displayed on a computer-generated user interface;
   determining, based at least in part on the determined location, that the tracking device has met one or more criteria of the event trigger; and
   modifying the operation of the building system when one or more criteria of the preprogrammed event trigger are met.

14. The method of claim 13, further comprising determining a direction of the tracking device.

15. The method of claim 13, further comprising determining a speed of the tracking device.

16. The method of claim 13, further comprising determining a time at which the tracking device passes or arrives at the geographic boundary.

17. The method of claim 13, further comprising determining a location of a second tracking device.

18. The method of claim 17, wherein creating an event trigger with one or more criteria includes creating the event criteria with a location of the second tracking device.

* * * * *